US010520195B2

(12) United States Patent
Pal et al.

(10) Patent No.: US 10,520,195 B2
(45) Date of Patent: Dec. 31, 2019

(54) EFFERVESCENT ATOMIZING STRUCTURE AND METHOD OF OPERATION FOR ROTATING DETONATION PROPULSION SYSTEM

(71) Applicant: General Electric Company, Schenectady, NY (US)

(72) Inventors: Sibtosh Pal, Mason, OH (US); Joseph Zelina, Waynesville, OH (US); Arthur Wesley Johnson, Cincinnati, OH (US); Clayton Stuart Cooper, Loveland, OH (US); Steven Clayton Vise, Loveland, OH (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 15/618,637

(22) Filed: Jun. 9, 2017

(65) Prior Publication Data

US 2018/0356096 A1   Dec. 13, 2018

(51) Int. Cl.
*F23R 3/36* (2006.01)
*F23R 7/00* (2006.01)
*F02C 5/00* (2006.01)
*F02K 7/02* (2006.01)
*F23R 3/56* (2006.01)

(52) U.S. Cl.
CPC ............... *F23R 3/36* (2013.01); *F02C 5/00* (2013.01); *F02K 7/02* (2013.01); *F23R 3/56* (2013.01); *F23R 7/00* (2013.01)

(58) Field of Classification Search
CPC ....... F23R 7/00; F02K 7/02; F02K 7/08; F02C 5/00; F02C 5/02; F02C 5/10; F02C 5/11
See application file for complete search history.

(56) References Cited

U.S. PATENT DOCUMENTS

| 45,396 A | 12/1864 | Doerksen |
|---|---|---|
| 2,774,629 A | 12/1956 | Noon et al. |
| 2,888,803 A | 6/1959 | Pon |
| 2,936,577 A | 5/1960 | Amneus |
| 3,240,010 A | 3/1966 | Morrison et al. |
| 4,397,613 A | 8/1983 | Keller |
| 5,345,758 A | 9/1994 | Bussing |
| 5,800,153 A | 9/1998 | DeRoche |
| 5,884,611 A | 3/1999 | Tarr et al. |
| 6,439,209 B1 | 8/2002 | Wenger et al. |
| 6,449,939 B1 | 9/2002 | Snyder |

(Continued)

*Primary Examiner* — Scott J Walthour
*Assistant Examiner* — Todd N Jordan
(74) *Attorney, Agent, or Firm* — Dority & Manning, P.A.

(57) ABSTRACT

A method and system of effervescent atomization of liquid fuel for a rotating detonation combustor (RDC) for a propulsion system is provided. The method includes flowing liquid fuel through a fuel injection port of a nozzle assembly of the RDC system; flowing a gas through the fuel injection port of the nozzle assembly volumetrically proportional to the liquid fuel; producing a gas-liquid fuel mixture at the fuel injection port by mixing the flow of gas and the flow of liquid fuel; flowing an oxidizer through a nozzle flowpath of the RDC system; producing an oxidizer-gas-liquid fuel mixture by mixing the gas-liquid fuel mixture and the flow of oxidizer within the nozzle flowpath; and igniting the oxidizer-gas-liquid fuel mixture within a combustion chamber of the RDC system.

16 Claims, 6 Drawing Sheets

(56) References Cited

U.S. PATENT DOCUMENTS

| | | | |
|---|---|---|---|
| 6,460,342 B1 | 10/2002 | Nalim | |
| 6,526,936 B2 | 3/2003 | Nalim | |
| 6,584,765 B1 | 7/2003 | Tew et al. | |
| 6,845,620 B2 | 1/2005 | Nalim | |
| 6,988,493 B2 | 1/2006 | Wenger et al. | |
| 7,506,496 B2 * | 3/2009 | Mantchenkov | F23D 11/16 60/39.461 |
| 7,568,345 B2 * | 8/2009 | Furletov | F23D 11/24 60/737 |
| 7,669,406 B2 | 3/2010 | Tangirala et al. | |
| 7,958,732 B2 | 6/2011 | Lu et al. | |
| 8,544,280 B2 | 10/2013 | Lu et al. | |
| RE45,396 E | 3/2015 | Muller et al. | |
| 9,512,805 B2 * | 12/2016 | Snyder | F23R 7/00 |
| 2002/0108376 A1 | 8/2002 | Stevens | |
| 2013/0298569 A1 | 11/2013 | Nilsson | |
| 2018/0274439 A1 * | 9/2018 | Holley | F02K 7/00 |
| 2018/0355792 A1 * | 12/2018 | Pal | F02C 3/16 |
| 2018/0355795 A1 * | 12/2018 | Pal | F23R 3/286 |
| 2018/0356093 A1 * | 12/2018 | Pal | F23R 3/04 |
| 2018/0356094 A1 * | 12/2018 | Zelina | F23R 3/002 |
| 2019/0040828 A1 * | 2/2019 | Wolanski | F23R 3/32 |

* cited by examiner

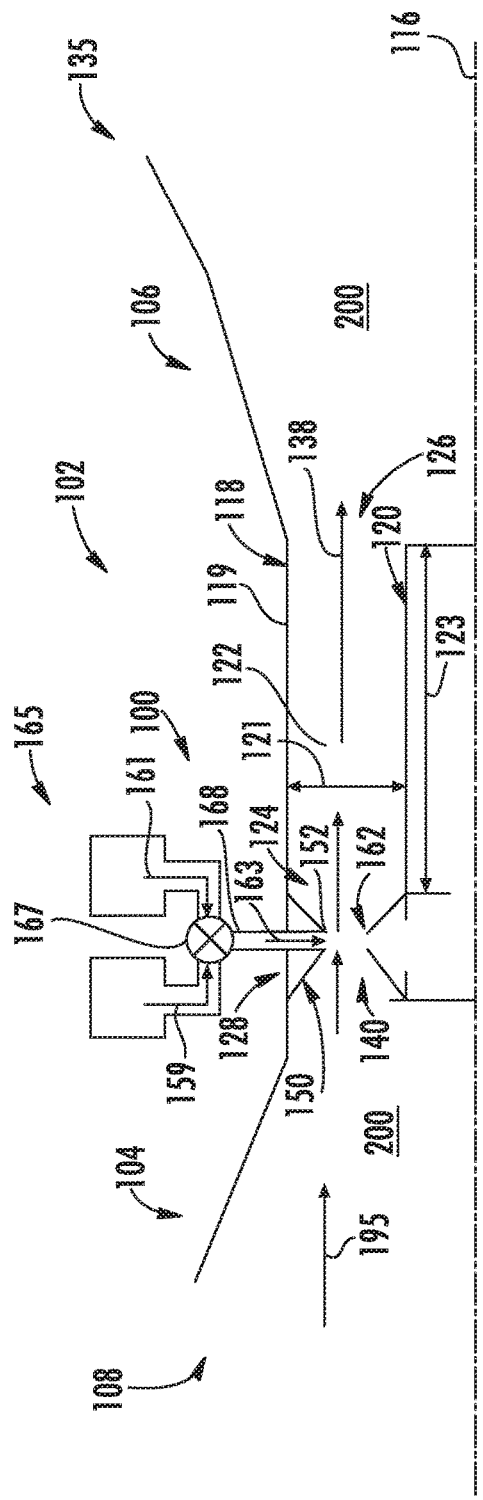
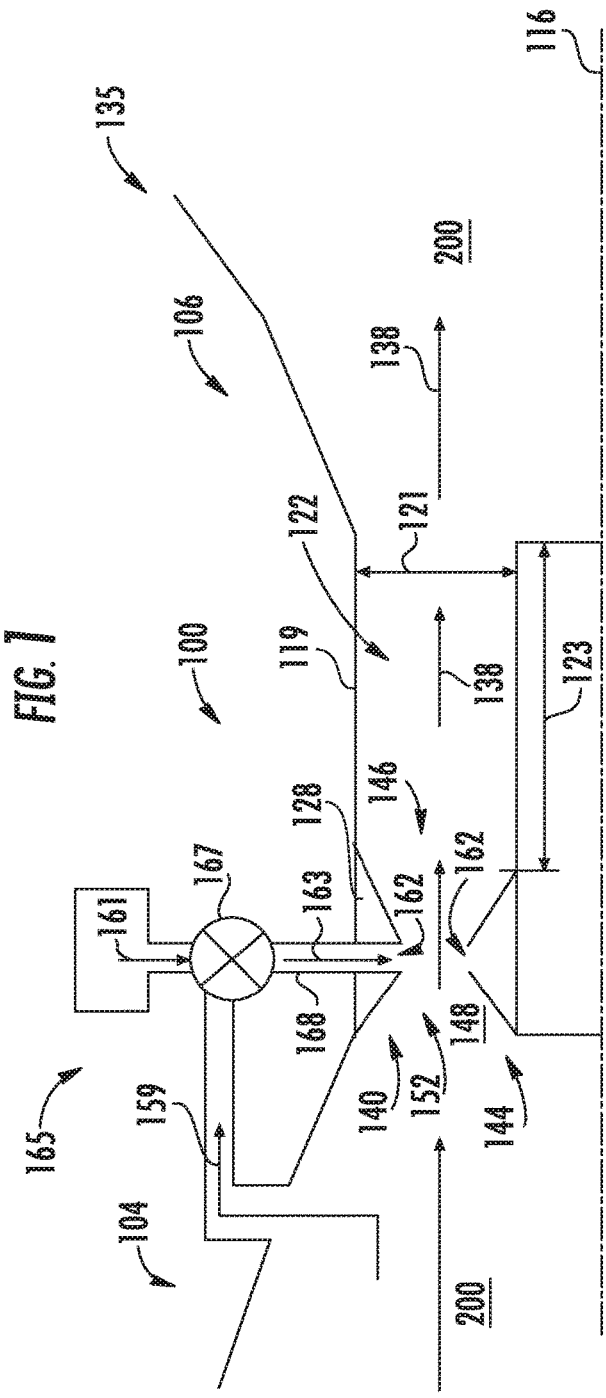

EFFERVESCENT ATOMIZING STRUCTURE AND METHOD OF OPERATION FOR ROTATING DETONATION PROPULSION SYSTEM

FIELD

The present subject matter relates generally to a system of continuous detonation in a propulsion system.

BACKGROUND

Many propulsion systems, such as gas turbine engines, are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such propulsion systems generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are welcomed nonetheless.

Accordingly, improvements in engine efficiency have been sought by modifying the engine architecture such that the combustion occurs as a detonation in either a continuous or pulsed mode. The pulsed mode design involves one or more detonation tubes, whereas the continuous mode is based on a geometry, typically an annulus, within which single or multiple detonation waves spin. For both types of modes, high energy ignition detonates a fuel/air mixture that transitions into a detonation wave (i.e., a fast moving shock wave closely coupled to the reaction zone). The detonation wave travels in a Mach number range greater than the speed of sound (e.g., Mach 4 to 8) with respect to the speed of sound of the reactants. The products of combustion follow the detonation wave at the speed of sound relative to the detonation wave and at significantly elevated pressure. Such combustion products may then exit through a nozzle to produce thrust or rotate a turbine. With various rotating detonation systems, the task of preventing backflow into the lower pressure regions upstream of the rotating detonation has been addressed by providing a steep pressure drop into the combustion chamber. However, such may reduce the efficiency benefits of the rotating detonation combustion system.

Generally, a detonation combustion system is based on whether a minimum quantity of detonation cells can be sustained in an annular combustion chamber. The detonation cell is characterized by a cell width ($\lambda$) that depends on the type of fuel and oxidizer as well as the pressure and temperature of the reactants at the combustion chamber and the stoichiometry ($\phi$) of the reactants. For each combination of fuel and oxidizer, cell size decreases with increasing pressure and temperature, and for stoichiometry greater than or less than 1.0. In various propulsion system apparatuses, such as for gas turbine engines, the cell width may decrease by 20 times or more from a lowest steady state operating condition (e.g., ground idle) to a highest steady state operating condition (e.g., maximum takeoff).

It is generally known in the art that combustion chamber geometry is defined by a desired detonation cell size based on the fuel-oxidizer mixture and the pressure, temperature, and stoichiometric ratio thereof. Various combinations of fuel-oxidizer mixture, pressure, temperature, and stoichiometric ratio (e.g., at various operating conditions of the propulsion system) may render a fixed geometry combustion chamber inefficient at more than one operating condition. However, variable geometry combustion chambers generally involve complex structures that may significantly reduce or eliminate overall propulsion system efficiency or operability.

Rotating detonation combustors are generally annular and require fuel-oxidizer injection to approach pre-mixed conditions in minimal length while mitigating flameholding within the combustion combustor. Thus, rotating detonation combustion systems generally require a plurality of minimally sized orifices for rapid mixing of fuel and oxidizer within the injector. The liquid fuel also needs to be atomized into very small droplets for the rotating detonation wave to be effected. Liquid fuel atomization may generally be due to momentum transfer from the air streams of the injector.

However, such known geometries generally inhibit application of rotating detonation combustion systems into increasingly smaller apparatuses, or generally require tight-tolerance features that increase the complexity of manufacturing of the combustion system, each of which may limit application of rotating detonation combustion systems.

Therefore, there is a need for a detonation combustion system that provides improved liquid fuel atomization. Additionally, there is a need for a detonation combustion system that provides a desired detonation cell size across a plurality of operating conditions.

BRIEF DESCRIPTION

Aspects and advantages of the invention will be set forth in part in the following description, or may be obvious from the description, or may be learned through practice of the invention.

The present disclosure is directed to a method of effervescent atomization of liquid fuel for a rotating detonation combustor (RDC) for a propulsion system. The method includes flowing liquid fuel through a fuel injection port of a nozzle assembly of the RDC system; flowing a gas through the fuel injection port of the nozzle assembly volumetrically proportional to the liquid fuel; producing a gas-liquid fuel mixture at the fuel injection port by mixing the flow of gas and the flow of liquid fuel; flowing an oxidizer through a nozzle flowpath of the RDC system; producing an oxidizer-gas-liquid fuel mixture by mixing the gas-liquid fuel mixture and the flow of oxidizer within the nozzle flowpath; and igniting the oxidizer-gas-liquid fuel mixture within a combustion chamber of the RDC system.

In one embodiment, producing a gas-liquid fuel mixture includes producing a volumetric flow ratio of gas to liquid fuel of approximately 1000% or less.

In another embodiment, flowing a gas includes flowing air or inert gas.

In various embodiments, flowing a gas includes flowing a gaseous fuel. In one embodiment, flowing a gaseous fuel includes flowing a gaseous fuel defining a detonation cell width of the gaseous fuel less than a detonation cell width of the liquid fuel.

In another embodiment, flowing a gas includes flowing a gas at a pressure greater than the flow of liquid fuel within the fuel injection port.

In still another embodiment, producing a gas-liquid fuel mixture includes producing a mass flow ratio of gas to liquid fuel of approximately 30% or less.

In still yet another embodiment, producing a gas-liquid fuel mixture defines an annular flow, a mist flow, or a disperse flow of the gas-liquid fuel mixture based at least on a gas volumetric flux and a liquid fuel volumetric flux.

The present disclosure is further directed to a method of operating a propulsion system at an approximately constant detonation cell size for a propulsion system including a rotating detonation combustion (RDC) system. The method includes flowing a liquid fuel through a fuel injection port of a nozzle assembly of the RDC system; flowing a gaseous fuel through the fuel injection port of the nozzle assembly volumetrically proportional to the liquid fuel; producing a gas-liquid fuel mixture at the fuel injection port by mixing the flow of gas and the flow of liquid fuel; flowing an oxidizer through a nozzle flowpath of the RDC system; producing an oxidizer-gas-liquid fuel mixture by mixing the gas-liquid fuel mixture and the flow of oxidizer within the nozzle flowpath; igniting the oxidizer-gas-liquid fuel mixture within a combustion chamber of the RDC system; and adjusting a volumetric flow of gaseous fuel relative to the liquid fuel based at least on a commanded operating condition of the propulsion system.

In one embodiment, flowing a gaseous fuel is based at least on a desired detonation cell size at a first operating condition of the propulsion system.

In various embodiments, adjusting the volumetric flow of gaseous fuel is based at least on maintaining an approximately constant detonation cell width at a second operating condition greater than the first operating condition. In one embodiment, adjusting the volumetric flow of gaseous fuel is based at least on maintaining an approximately constant detonation cell width at a stoichiometric ratio of approximately 1.0 or less at the second operating condition.

In another embodiment, adjusting the volumetric flow of gaseous fuel is based at least on a pressure and a temperature of oxidizer at the RDC system.

In still another embodiment, flowing a gaseous fuel includes flowing a gaseous fuel defining a detonation cell width of the gaseous fuel less than a detonation cell width of the liquid fuel.

In still yet another embodiment, the method further includes adjusting the flow of liquid fuel based at least on the commanded operating condition of the propulsion system.

In one embodiment, producing a gas-liquid fuel mixture includes producing a volumetric flow ratio of gas to liquid fuel of approximately 1000% or less.

In another embodiment, producing a gas-liquid fuel mixture includes producing a mass flow ratio of gas to liquid fuel of approximately 30% or less.

In still another embodiment, producing a gas-liquid fuel mixture defines an annular flow, a mist flow, or a disperse flow of the gas-liquid fuel mixture based at least on a gas volumetric flux and a liquid fuel volumetric flux.

The present disclosure is further directed to a system for providing effervescent atomization of a liquid fuel to a rotating detonation combustion (RDC) system for a propulsion system. The propulsion system includes a first pump configured to provide variable flow rates of a gas to the RDC system and a second pump configured to provide variable flow rates of a liquid fuel to the RDC system, and a computing device comprising one or more processors and one or more memory devices, the one or more memory devices storing instructions that when executed by the one or more processors cause the one or more processors to perform operations. The operations include receiving a commanded operating condition from a propulsion system operator, in which the commanded operating condition is indicative of one or more parameters based at least on one or more of a commanded thrust output, shaft speed, and engine pressure ratio, and the one or more parameters includes a liquid fuel flow rate and a pressure and temperature of oxidizer at the RDC system; and determining a volumetric flow rate of gas to mix with the liquid fuel based at least on the liquid fuel flow rate and a desired two-phase flow regime of a gas-liquid fuel mixture.

In one embodiment of the system, determining a volumetric flow rate of gas to mix with the liquid fuel is further based on maintaining a desired detonation cell width at a combustion chamber of the RDC system, and wherein the desired detonation cell width is based at least on a pressure and temperature of oxidizer at the RDC system, a volumetric flow ratio of a mixture of a gaseous fuel and a liquid fuel, an annular gap of the combustion chamber, and a combustion chamber length.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a propulsion system in accordance with an exemplary embodiment of the present disclosure;

FIG. 2 is a cross-sectional view of a rotating detonation combustion system in accordance with another exemplary embodiment of the present disclosure;

DETAILED DESCRIPTION

Figure 3:
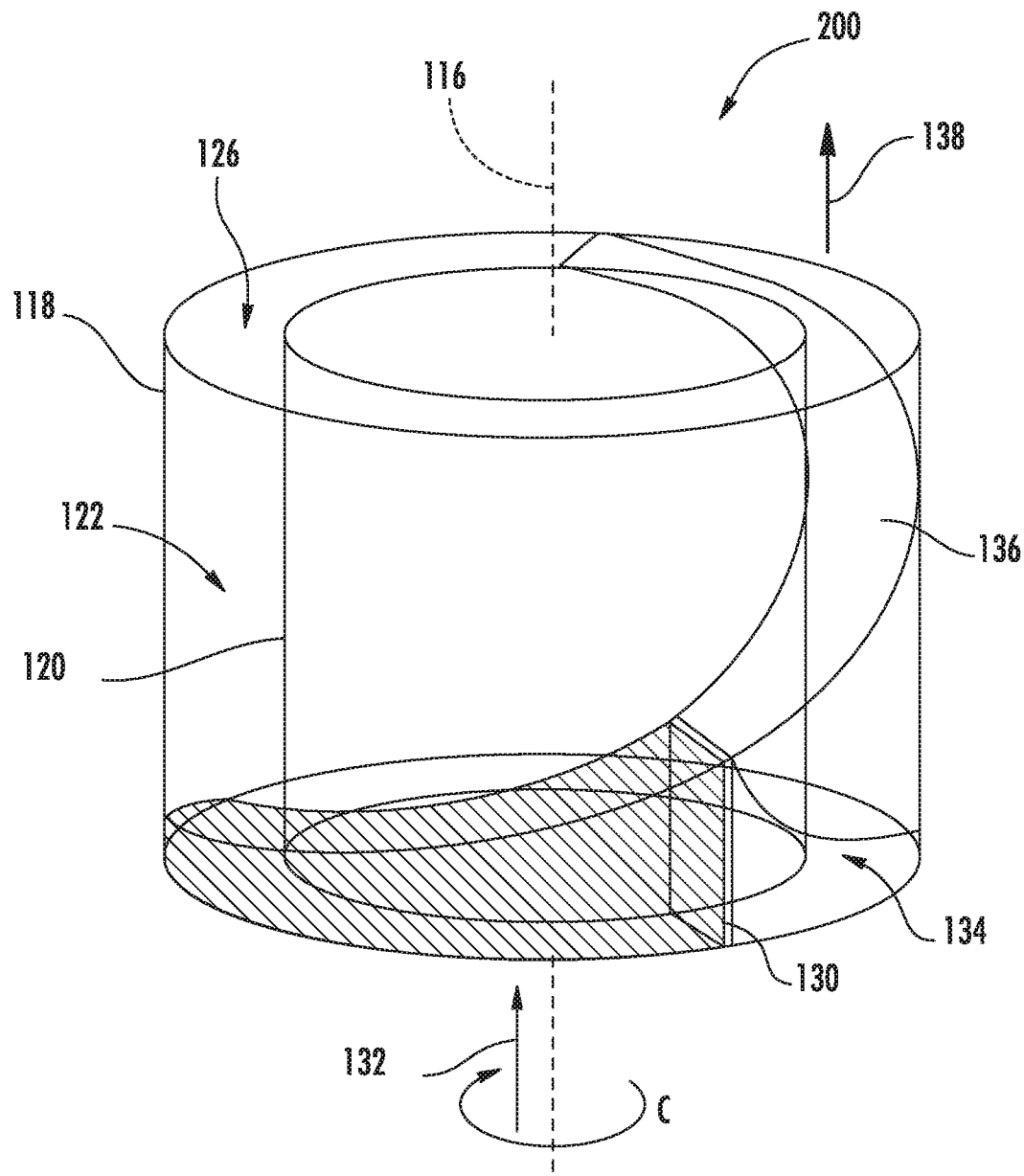
FIG. 3 is an exemplary embodiment of a combustion chamber of a rotating detonation combustion system in accordance with an embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a propulsion system or vehicle, and refer to the normal operational attitude of the propulsion system or vehicle. For example, with regard to a propulsion system, forward refers to a position closer to a propulsion system inlet and aft refers to a position closer to a propulsion system nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Methods and structures for operating a propulsion system including a rotating detonation combustion system are provided for improved liquid fuel atomization. The methods and structures provided herein may further provide a desired detonation cell size across a plurality of operating conditions. The various embodiments of the propulsion system provided herein, and methods of operation thereof, include an effervescent fuel atomizing structure that may improve liquid fuel atomization. The effervescent fuel atomizing structure may enable larger fuel-oxidizer injection ports at the rotating detonation combustion system, thereby relieving the necessity for smaller orifices. The effervescent fuel atomizing structure may further enable control and operating of the rotating detonation combustion system at an approximately constant detonation cell size, thereby enabling operability, combustion stability, and improved performance (e.g. emissions, fuel burn, dynamics, etc.) across a plurality of operating conditions ranging from a lowest pressure and temperature to a highest pressure and temperature at the rotating detonation combustion system.

Referring now to the figures, FIG. 1 depicts a propulsion system 102 including a rotating detonation combustion system 100 (an "RDC system") in accordance with an exemplary embodiment of the present disclosure. The propulsion system 102 generally includes an inlet section 104 and an outlet section 106, with the RDC system 100 located downstream of the inlet section 104 and upstream of the exhaust section 106. In various embodiments, the propulsion system 102 defines a gas turbine engine, a ramjet, or other propulsion system including a fuel-oxidizer burner producing combustion products that provide propulsive thrust or mechanical energy output. In an embodiment of the propulsion system 102 defining a gas turbine engine, the inlet section 104 includes a compressor section defining one or more compressors generating an overall flow of oxidizer 195 to the RDC system 100. The inlet section 104 may generally guide a flow of the oxidizer 195 to the RDC system 100. The inlet section 104 may further compress the oxidizer 195 as it enters an inlet 108 of and through the inlet section 104 before it enters the RDC system 100. The inlet section 104 defining a compressor section may include one or more alternating stages of rotating compressor airfoils. In other embodiments, the inlet section 104 may generally define a decreasing cross sectional area from an upstream end to a downstream end proximate to the RDC system 100.

As will be discussed in further detail below, at least a portion of the overall flow of oxidizer 195 is mixed with a liquid fuel 163 (shown in FIG. 2) and detonated to generate combustion products 138. The combustion products 138 flow downstream to the exhaust section 106. In various embodiments, the exhaust section 106 may generally define an increasing cross sectional area from an upstream end proximate to the RDC system 100 to a downstream end of the propulsion system 102. Expansion of the combustion products 138 generally provides thrust that propels the apparatus to which the propulsion system 102 is attached, or provides mechanical energy to one or more turbines further coupled to a fan section, a generator, or both. Thus, the exhaust section 106 may further define a turbine section of a gas turbine engine including one or more alternating rows or stages of rotating turbine airfoils. The combustion products 138 may flow from the exhaust section 106 through, e.g., an exhaust nozzle 135 to generate thrust for the propulsion system 102.

As will be appreciated, in various embodiments of the propulsion system 102 defining a gas turbine engine, rotation of the turbine(s) within the exhaust section 106 generated by the combustion products 138 is transferred through one or more shafts or spools to drive the compressor(s) within the inlet section 104. In various embodiments, the inlet section 104 may further define a fan section, such as for a turbofan engine configuration, such as to propel air across a bypass flowpath outside of the RDC system 100 and exhaust section 106.

It will be appreciated that the propulsion system 102 depicted schematically in FIG. 1 is provided by way of example only. In certain exemplary embodiments, the propulsion system 102 may include any suitable number of compressors within the inlet section 104, any suitable number of turbines within the exhaust section 106, and further may include any number of shafts or spools appropriate for mechanically linking the compressor(s), turbine(s), and/or fans. Similarly, in other exemplary embodiments, the propulsion system 102 may include any suitable fan section, with a fan thereof being driven by the exhaust section 106 in any suitable manner. For example, in certain embodiments, the fan may be directly linked to a turbine within the exhaust section 106, or alternatively, may be driven by a turbine within the exhaust section 106 across a reduction gearbox. Additionally, the fan may be a variable pitch fan, a fixed pitch fan, a ducted fan (i.e., the propulsion system 102 may include an outer nacelle surrounding the fan section), an un-ducted fan, or may have any other suitable configuration.

Moreover, it should also be appreciated that the RDC system 100 may further be incorporated into any other suitable aeronautical propulsion system, such as a turboshaft engine, a turboprop engine, a turbojet engine, a ramjet engine, a scramjet engine, etc. Further, in certain embodiments, the RDC system 100 may be incorporated into a non-aeronautical propulsion system, such as a land-based or marine-based power generation system. Further still, in certain embodiments, the RDC system 100 may be incorporated into any other suitable propulsion system, such as a rocket or missile engine. With one or more of the latter embodiments, the propulsion system may not include a compressor in the inlet section 104 or a turbine in the exhaust section 106.

Referring now to FIGS. 1-2, an exemplary embodiment of an RDC system 100 of the propulsion system of FIG. 1 is generally provided. The RDC system 100 generally includes a generally cylindrical walled enclosure 119 defining, at least in part, a combustion chamber 122, a combustion inlet 124, and a combustion outlet 126. The combustion chamber 122 defines an annular combustion chamber length 123 from approximately the combustion inlet 124 to the combustion outlet 126. The combustion chamber 122 further defines an annular gap or annular combustion chamber width 121 extended from an inner diameter wall to an outer diameter wall. The combustion chamber length 123 and the combustion chamber width 121 together define a combustion chamber volume. The combustion chamber 122 defined by the walled enclosure 119 generally defines a fixed or constant volume. In the embodiments generally provided herein, the combustion chamber length 123 and width 121 are each variables for determining the volume of the combustion chamber 122. For example, in various embodiments, the length 123 and width 121 of the combustion chamber 122 is generally sized for a minimum or lowest steady state operating condition of the propulsion system, such as a lowest pressure and temperature of oxidizer in the combustion chamber 122. The lowest steady state operating condition of the propulsion system generally results in a configuration of the RDC system 100 or, more specifically, the combustion chamber 122, at a maximum volume directly related to a detonation cell size of a fuel-oxidizer mixture in the combustion chamber 122. Still more specifically, the lowest steady state operating condition results in a configuration of the combustion chamber 122 at a maximum combustion chamber length 123 and width 121 related to a detonation cell size of fuel-oxidizer mixture in the combustion chamber 122.

Referring still to FIGS. 1-2, the RDC system 100 further includes a nozzle assembly 128 located at the combustion inlet 124. The nozzle assembly 128 provides a flow mixture of oxidizer and fuel to the combustion chamber 122, wherein such mixture is combusted/detonated to generate the combustion products therein, and more specifically a detonation wave 130 as will be explained in greater detail below. The combustion products exit through the combustion chamber outlet 126.

The nozzle assembly 128 is defined at the upstream end of the walled enclosure 119 at the combustion chamber inlet 124. The nozzle assembly 128 generally defines a nozzle inlet 144, a nozzle outlet 146 adjacent to the combustion inlet 124 and combustion chamber 122, and a throat 152 between the nozzle inlet 144 and nozzle outlet 146. A nozzle flowpath 148 is defined from the nozzle inlet 144 through the throat 152 and the nozzle outlet 146. The nozzle flowpath 148 defines in part a primary flowpath 200 through which an oxidizer flows from an upstream end of the propulsion system through the inlet 108 to the combustion chamber 122 and to a downstream end of the propulsion system through the exhaust nozzle 135. The nozzle assembly 128 generally defines a converging-diverging nozzle, i.e. the nozzle assembly 128 defines a decreasing cross sectional area from approximately the nozzle inlet 144 to approximately the throat 152, and further defines an increasing cross sectional area from approximately the throat 152 to approximately the nozzle outlet 146.

Between the nozzle inlet 144 and the nozzle outlet 146, a fuel injection port 162 is defined in fluid communication with nozzle flowpath 148 or, more generally, the primary flowpath 200, through which the oxidizer flows. The fuel injection port 162 introduces a liquid or gaseous fuel 163, or mixtures thereof, to the flow of oxidizer through the nozzle flowpath 148 and, generally, the primary flowpath 200. In various embodiments, the fuel injection port 162 is disposed at approximately the throat 152 of the nozzle assembly 128. In an embodiment of the RDC system 100 defining a generally annular walled enclosure 119 (e.g., defined by an outer wall 118 and an inner wall 120 shown in FIG. 1) and defining a generally annular combustion chamber 122, a plurality of fuel injection ports 162 are defined in adjacent circumferential arrangement around the longitudinal centerline 116.

The primary flowpath 200 extends generally through the propulsion system from the inlet section 104 through the RDC system 100 and the exhaust section 206. In various embodiments, such as in gas turbine engines, the primary flowpath 200 extends through the compressor section through which the oxidizer is compressed before entering the RDC system 100. Furthermore, in such an embodiment, the primary flowpath 200 extends through the turbine section through which combustion products expand and drive one or more turbines that drive one or more compressors, a fan section, or a power generation apparatus. More specifically for the RDC system 100 generally provided, the primary flowpath 200 generally extends through the length of the nozzle flowpath 148 and the combustion chamber 122.

Referring briefly to FIG. 3, providing a perspective view of the combustion chamber 122 (without the nozzle assembly 128), it will be appreciated that the RDC system 100 generates the detonation wave 130 during operation. The detonation wave 130 travels in the circumferential direction C of the RDC system 100 consuming an incoming fuel/oxidizer mixture 132 and providing a high pressure region 134 within an expansion region 136 of the combustion. A burned fuel/oxidizer mixture 138 (i.e., combustion products) exits the combustion chamber 122 and is exhausted.

More particularly, it will be appreciated that the RDC system 100 is of a detonation-type combustor, deriving energy from the continuous wave 130 of detonation. For a detonation combustor, such as the RDC system 100 disclosed herein, the combustion of the fuel/oxidizer mixture 132 (i.e., the mixture of the fuel 163 and the first portion 205 of oxidizer through the primary flowpath 200 as generally provided in FIGS. 1-2) is effectively a detonation as compared to a burning, as is typical in the traditional deflagration-type combustors. Accordingly, a main difference between deflagration and detonation is linked to the mechanism of flame propagation. In deflagration, the flame propagation is a function of the heat transfer from a reactive zone to the fresh mixture, generally through conduction. By contrast, with a detonation combustor, the detonation is a shock induced flame, which results in the coupling of a reaction zone and a shockwave. The shockwave compresses and heats the fresh mixture 132, increasing such mixture 132 above a self-ignition point. On the other side, energy released by the combustion contributes to the propagation of the detonation shockwave 130. Further, with continuous detonation, the detonation wave 130 propagates around the combustion chamber 122 in a continuous manner, operating at a relatively high frequency. Additionally, the detonation wave 130 may be such that an average pressure inside the combustion chamber 122 is higher than an average pressure within typical combustion systems (i.e., deflagration combustion systems). Accordingly, the region 134 behind the detonation wave 130 has very high pressures.

Referring now to FIGS. 1-3, the propulsion system 102 generally includes an effervescent fuel atomizing structure 165 (hereinafter "effervescent atomizer 165") configured to provide an effervescent flow of a mixture 163 of gas 159 and liquid fuel 161 through the nozzle assembly 128 of the RDC system 100 and into the primary flowpath 200 for detonation into combustion products 138. In one embodiment, such as generally provided in FIG. 1, the gas 159 is an oxidizer, such as air, or an inert gas, or a gaseous fuel. In another embodiment, such as generally provided in FIG. 2, the gas 159 is at least a portion of the oxidizer 195, such as air, drawn from the primary flowpath 200. The effervescent atomizer 165 may improve rapid mixing of the liquid fuel 161 when it is injected into the primary flowpath 200 and further mixed with the oxidizer 195. The effervescent atomizer 165 may further enable larger fuel injection ports 162 at the nozzle assembly 128, thereby reducing a need for small or tight-tolerance openings that may impede application of RDC systems 100 into smaller applications (e.g., ramjets, scramjets, missiles, rockets, etc.).

For example, a fuel injection port configured solely to flow a liquid fuel may define a diameter D. However, the fuel injection port 162 configured to flow the mixture 163 of gas 159 and liquid fuel 161 defines a diameter at least approximately 50% greater (1.5×) than diameter D. In various embodiments, the fuel injection port 162 may define a diameter at least approximately double (2×) of the diameter D, in which diameter D defines solely a liquid fuel flow to the nozzle flowpath 148. In such an embodiment, the fuel injection port 162 may flow the mixture 163 of gas 159, defining a gaseous fuel such as, but not limited to, hydrogen, and liquid fuel 161. As such, the larger fuel injection ports 162 may reduce the need for small or tight-tolerance fuel injection ports to the nozzle flowpath of the RDC system. The larger fuel injection ports 162 may further mitigate risk of clogging or other flow restriction due to impurities (e.g., dirt, fuel coking, carbon, etc.), domestic object debris (DOD), or foreign object debris (FOD) that may reduce combustion operation, efficiency, or performance.

The effervescent atomizer 165 generally includes a flow of gas 159 and a flow of liquid fuel 161 through separate conduits, manifolds, or other walled structures. A valve 167 regulates a ratio of mixture 163 of gas 159 and liquid fuel 161 into an effervescent flow manifold 168 leading to the nozzle assembly 128 and the primary flowpath 200. The effervescent atomizer 165 may further include one or more pressure, temperature, and/or flow sensors to monitor, measure, or calculate the flow of gas 159, liquid fuel 161, or the mixture 163, to the nozzle assembly 128 and primary flowpath 200. The one or more sensors may further provide data used to calculate a volumetric flow, or ratio thereof, of the gas 159 versus liquid fuel 161 in the mixture 163. The calculated volumetric flow may be utilized by the valve 167 to adjust a ratio of the gas 159 versus the liquid fuel 161 in the mixture 163 based at least on one or more operating conditions of the propulsion system 102, such as further explained in regard to FIGS. 7-8 providing flowcharts outlining exemplary steps of operating the propulsion system 102.

Although shown as a valve 167, the effervescent atomizer 165 may include a plurality of regulators or valves 167 (e.g., one-way valves, check valves, pressure regulating valves, etc.) that may combine the gas 159 and the liquid fuel 161 at a desired pressure, flow, or both. For example, the valve 167, or a plurality thereof, may be utilized to combine the gas 159 and the liquid fuel 161 at approximately equal pressures.

The effervescent atomizer 165 may further include one or more pumps (not shown) to increase a pressure of the gas 159, the liquid fuel 161, or both to the nozzle assembly 128. In one embodiment, in which the RDC system 100 defines a combustion section of a propulsion system, the pumps may provide the pressure necessary to overcome the pressure at the primary flowpath 200. However, in other embodiments, such as the RDC system 100 defining an inter-turbine burner or an afterburner to a propulsion system, the pumps may be excluded from the effervescent atomizer 165.

Though not provided in further detail, the propulsion system 102 generally provided in FIGS. 1-6 further includes a computing device that includes one or more processors and one or more memory devices. The one or more memory devices stores instructions that when executed by the one or more processors cause the one or more processors to perform operations. The operations include one or more of the steps generally provided in FIGS. 7-8 of the flowcharts outlining exemplary steps of a method of effervescent atomization of a liquid fuel (e.g., liquid fuel 161) with a gas (e.g., gas 159) in a propulsion system (e.g., propulsion system 102). The computing device is further configured to execute one or more operations for operating a propulsion system at an approximately constant detonation cell size at the combustion chamber (e.g., combustion chamber 122) of an RDC system (e.g. RDC system 100).

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel. In various embodiments, the computer-based systems may include one or more of, or a combination of, a full authority digital engine controller (FADEC), an electronic engine controller (EEC), an engine control unit (ECU), a power module, one or more sensors, actuators, transducers, or combinations thereof that may monitor, control, adjust, or otherwise manipulate a fluid flow within the propulsion system 102, including, but not limited to, the flow, pressure, and/or temperature of the oxidizer 195, gas 159, liquid fuel 161, and the gas-liquid fuel mixture 163.

Figure 6:
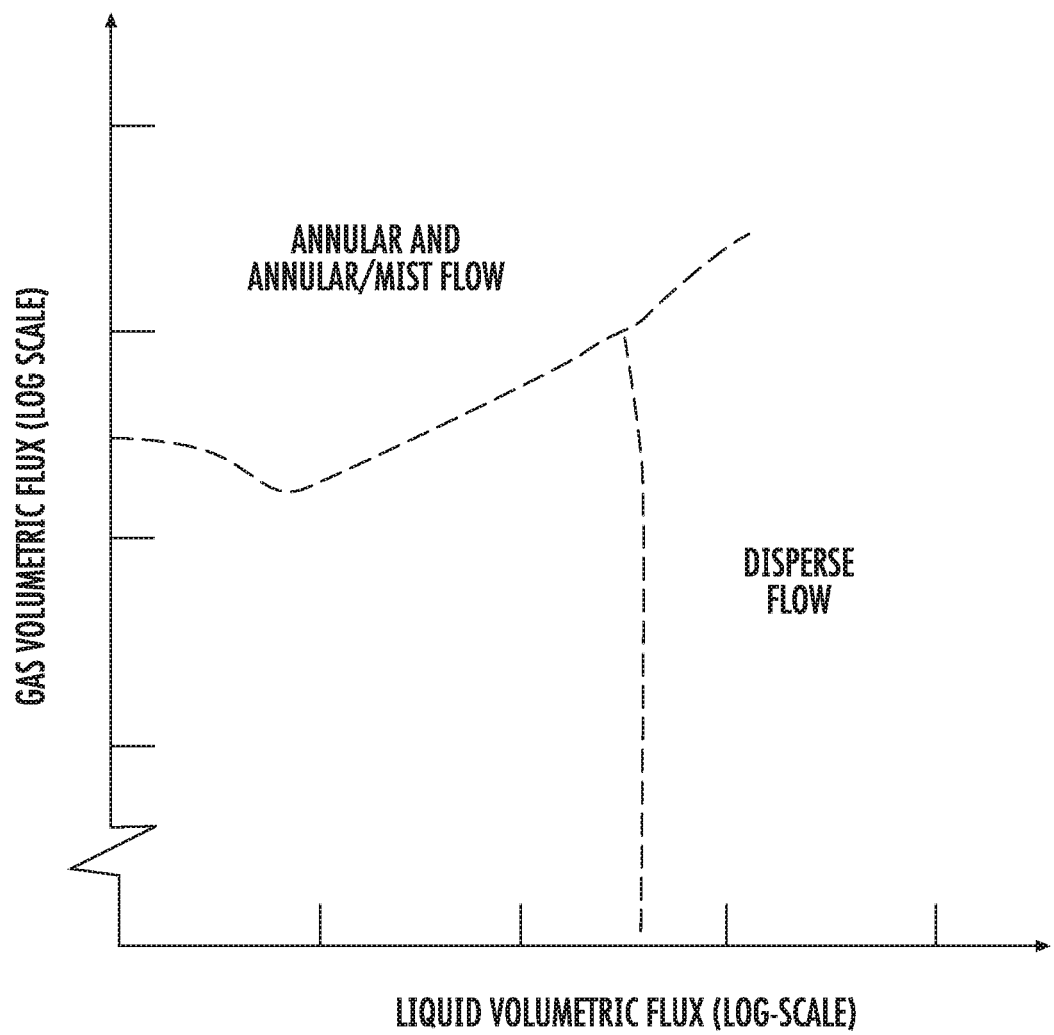
FIG. 6 is an exemplary embodiment of a chart generally showing two phase flow regimes as a function of gas volumetric flux and liquid volumetric flux according to an aspect of the present disclosure.
Figure 7:
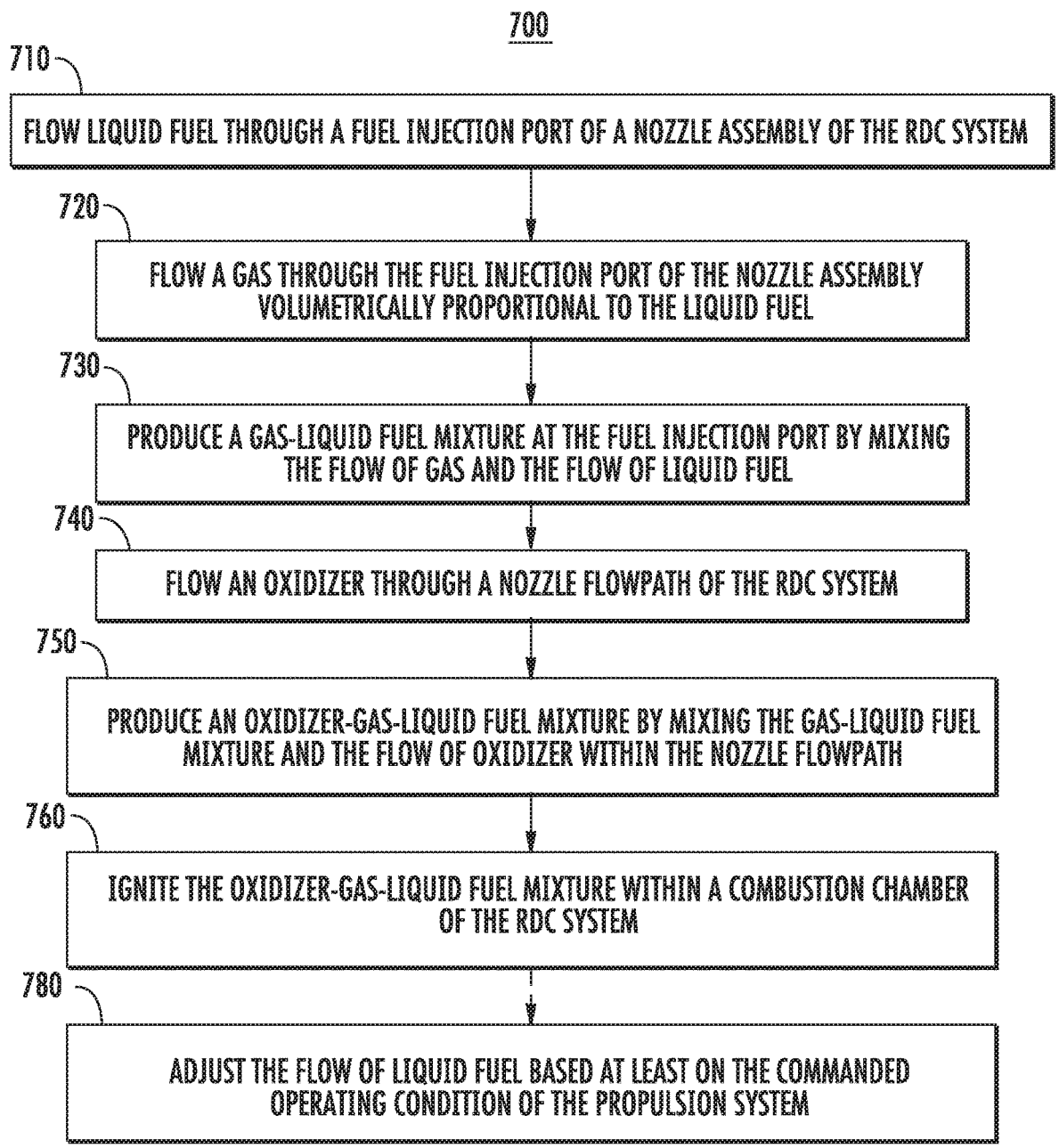
FIG. 7 is a flowchart outlining steps of a method of providing effervescent fuel atomization to a rotating detonation combustion system in accordance with an embodiment of the present disclosure.

Referring now to FIG. 7, a flowchart outlining exemplary steps of a method of effervescent atomization of liquid fuel for a rotating detonation combustor (RDC) for a propulsion system is generally provided (herein after "method 700"). The method 700 generally provided in FIG. 7 may be implemented with various embodiments of a propulsion system and RDC system, such as the propulsion system 102 and RDC system 100 shown and described in regard to FIGS. 1-7. The method 700 may improve liquid fuel atomization into a primary flowpath to be mixed and detonated with an oxidizer with improved efficiency, specific fuel consumption, and emissions. The method 700 may provide one or more of the aforementioned benefits while further enabling enlarged fuel injection ports (e.g., the fuel injection ports 162), thereby enabling application of RDC systems into apparatuses in which extremely small fuel injection ports may limit application of the RDC system.

The method 700 may be implemented with a propulsion system and RDC such as those described in regard to FIG. 1-5. FIG. 7 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

The RDC system may generally include a nozzle assembly configured to admit a flow of liquid fuel and a gas for mixing before injecting the gas-liquid fuel mixture to a primary flowpath through which an oxidizer flows. The method 700 includes at 710 flowing liquid fuel through a fuel injection port of a nozzle assembly of the RDC system; at 720 flowing a gas through the fuel injection port of the nozzle assembly volumetrically proportional to the liquid fuel; at 730 producing a gas-liquid fuel mixture at the fuel injection port by mixing the flow of gas and the flow of liquid fuel; at 740 flowing an oxidizer through a nozzle flowpath of the RDC system; at 750 producing an oxidizer-gas-liquid fuel mixture by mixing the gas-liquid fuel mixture and the flow of oxidizer within the nozzle flowpath; and at 760 igniting the oxidizer-gas-liquid fuel mixture within a combustion chamber of the RDC system.

In various embodiments, the liquid fuel includes, but is not limited to, a diesel, kerosene, naphtha, ethanol, methanol, oil, liquefied natural gas, liquefied petroleum gas, or combinations thereof. Various embodiments of the liquid fuel may be referred to as Jet A, Jet A-1, Jet B, or one or more Jet Propellant (JP) fuels.

In still various embodiments, the gas may include air, an inert gas, a gaseous fuel, or combinations thereof. The gaseous fuel may include hydrogen, coal gas, coke oven gas, refinery gas, ethane gases, including ethylene, or combinations thereof.

In one embodiment at 710, flowing a liquid fuel through a fuel injection port of a nozzle assembly includes flowing the liquid fuel 161 through the fuel injection port 162 of the nozzle assembly 128 generally provided in FIGS. 1-7. In various embodiments, the flow is provided, maintained, monitored, calculated, or controlled based at least on a volumetric flow rate of the liquid fuel.

In various embodiments at 730, producing a gas-liquid fuel mixture includes producing a volumetric flow ratio of gas to liquid fuel of approximately 1000% or less. For example, the volumetric flow of gas versus liquid fuel may be approximately 10 to 1 or less. In another embodiment at 720, producing a gas-liquid fuel mixture includes producing a mass flow ratio of gas to liquid fuel of approximately 30% or less.

Figure 4:
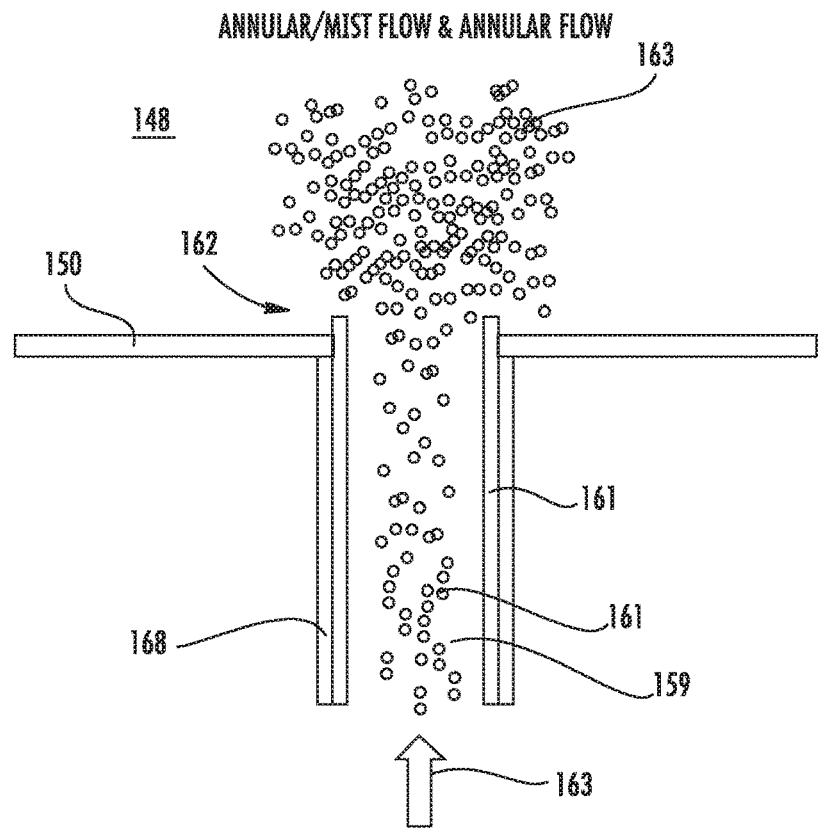
FIG. 4 is an exemplary embodiment of a portion of the propulsion system generally depicting a flow of a gas-liquid fuel mixture to a rotating detonation combustion system.
Figure 5:
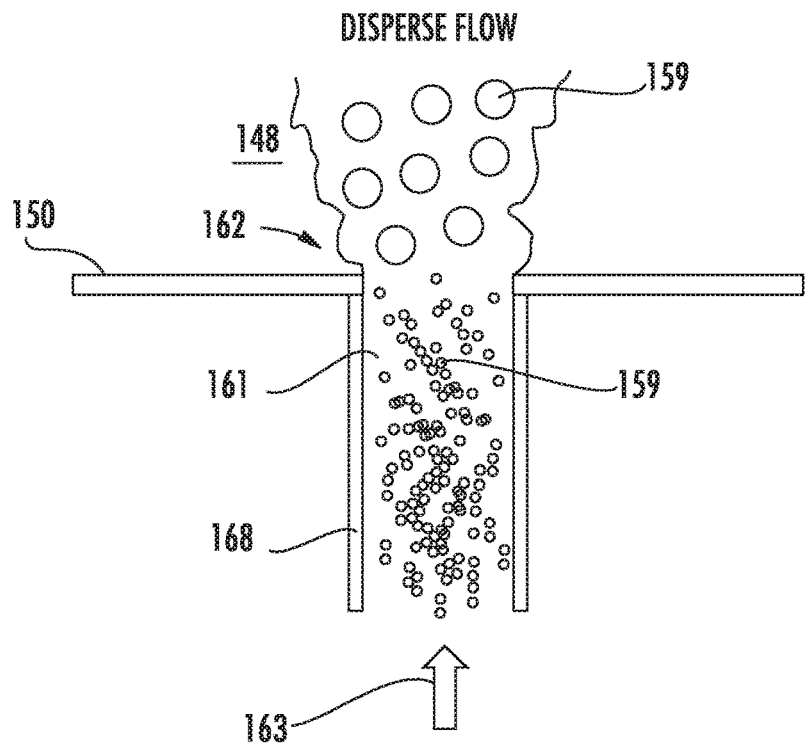
FIG. 5 is another exemplary embodiment of a portion of the propulsion system generally depicting a flow of a gas-liquid fuel mixture to a rotating detonation combustion system.

Referring briefly to FIG. 6, a two-phase chart 600 is generally provided showing a relationship of gas volumetric flux and liquid volumetric flux. In various embodiments, the volumetric flow of gas versus liquid fuel may be at least sufficient to induce a disperse flow (such as generally shown in FIG. 5) of the gas-liquid fuel mixture 163, or an annular or annular/mist flow of the gas-liquid mixture 163 (such as generally shown in FIG. 4).

Referring back to FIG. 7, in various embodiments of the method 700 at 720, flowing a gas includes flowing a gaseous fuel. In one embodiment, flowing the gaseous fuel includes flowing a gaseous fuel defining a detonation cell size of the gaseous fuel less than a detonation cell size of the liquid fuel. In one non-limiting example, the gaseous fuel defines hydrogen or an ethane gas, such as ethylene, defining a detonation cell size less than the liquid fuel defining, for example, a kerosene-based fuel such as Jet A.

Figure 8:
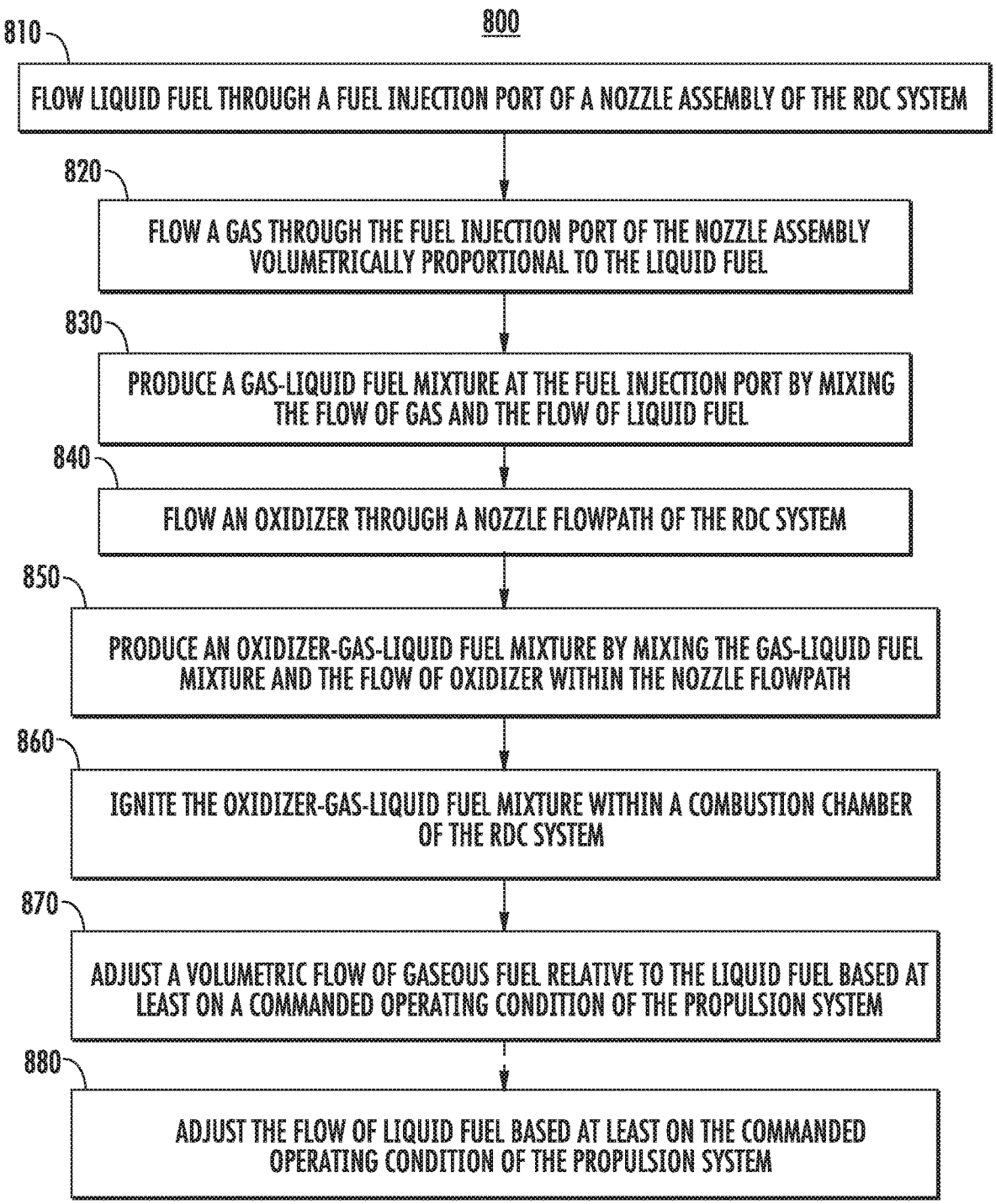
FIG. 8 is a flowchart outlining steps of a method of operating a propulsion system at an approximately constant cell size in accordance with an embodiment of the present disclosure.

Referring now to FIG. 8, a flowchart outlining exemplary steps of a method of operating a propulsion system at an approximately constant detonation cell size for a propulsion system comprising a rotating detonation combustion (RDC) system (hereinafter "method 800") is generally provided. The method 800 may be implemented using substantially similar systems, apparatuses, etc. as described in regard to FIGS. 1-8. Furthermore, the method 800 generally incorporates the steps described in regard to the method 700 outlined in regard to FIG. 7.

It should be appreciated that the method 800 may be implemented with a propulsion system and RDC such as those described in regard to FIGS. 1-7. FIG. 8 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

The method 800 includes at 810 flowing a liquid fuel through a fuel injection port of a nozzle assembly of the RDC system; at 820 flowing a gaseous fuel through the fuel injection port of the nozzle assembly volumetrically proportional to the liquid fuel; at 830 producing a gas-liquid fuel mixture at the fuel injection port by mixing the flow of gas and the flow of liquid fuel; at 840 flowing an oxidizer through a nozzle flowpath of the RDC system; at 850 producing an oxidizer-gas-liquid fuel mixture by mixing the gas-liquid fuel mixture and the flow of oxidizer within the nozzle flowpath; at 860 igniting the oxidizer-gas-liquid fuel mixture within a combustion chamber of the RDC system; and at 870 adjusting a volumetric flow of gaseous fuel relative to the liquid fuel based at least on a commanded operating condition of the propulsion system.

The steps at 810 through 860 may include the descriptions, embodiments, one or more limitations, or combinations thereof described in regard to steps 710 through 760 of method 700.

In various embodiments of the method 800, at 820 flowing a gaseous fuel is based at least on a desired detonation cell size at a first operating condition of the propulsion system. The first operating condition may generally refer to a lowest steady state pressure and/or temperature at the RDC system following initial ignition or start-up of the propulsion system. For example, in an embodiment in which the propulsion system defines a gas turbine engine, the first operating condition may be ground idle. At the first operating condition, the RDC system defines a minimum quantity of detonation cells and approximately constant cell size suitable for stable or optimal operation of the RDC system. The RDC system, such as the combustion chamber 122, may define the annular gap 121, the combustion chamber length 123, or both to produce a desired quantity and size of detonation cells at the pressure and temperature conditions of the oxidizer and the flow of gas-liquid fuel mixture corresponding to the first operating condition.

The propulsion system further defines a second operating condition different from the first operating condition. The second operating condition generally defines pressures and temperatures at the RDC system greater than the first operating condition. For example, in an embodiment in which the propulsion system defines a gas turbine engine, the second operating condition may define one or more steady state conditions such as maximum takeoff, climb, cruise, flight idle, approach, reverse thrust, etc., and transient conditions therebetween.

In one embodiment at 870, adjusting the volumetric flow of gaseous fuel is based at least on maintaining an approximately constant detonation cell width at a second operating condition greater than the first operating condition. In various embodiments, the volumetric flow of gaseous fuel mixed with the liquid fuel is based at least in part on maintaining an approximately constant detonation cell size at the second operating condition (i.e., the plurality of operating conditions of the propulsion system greater than the first operating condition) relative to the first operating condition defining a lowest steady state operating condition.

In another embodiment at 870, adjusting the volumetric flow of gaseous fuel is based at least on maintaining an approximately constant detonation cell size at a stoichiometric ratio of detonated fuel and oxidizer of approximately 1.0 or less at the second operating condition. In still other embodiments at 870, adjusting the volumetric flow of gaseous fuel is based at least on a pressure and a temperature of oxidizer at the RDC system.

For example, the combustion chamber 122 of the RDC system 100 may be configured to yield a stoichiometric ratio of detonated fuel and oxidizer 138 of approximately 1.0 or less at the first operating condition. The detonation cell size of the detonated fuel-oxidizer mixture 138 may be based on the annular gap 121 and the combustion chamber length 123 together defining a generally fixed or constant volume of the combustion chamber 122. The volume may be based at least on maintaining a desired operation or performance of the propulsion system 102 at a lowest steady state operating condition following ignition or light off. As the propulsion system 102 changes from the first operating condition to the second operating condition, the detonation cell size may generally change as a function of at least the pressure and temperature of oxidizer 195 entering the RDC system 100 and the gas-liquid fuel mixture 163 mixing with the oxidizer 195.

More specifically, in various embodiments, flowing the gaseous fuel includes flowing a gaseous fuel defining a detonation cell width of the gaseous fuel less than a detonation cell width of the liquid fuel. For example, the detonation cell size is at least a function of the cell size properties of the liquid fuel 159 and the gaseous fuel 161 and the ratio each fuel 159, 161 in the gas-liquid fuel mixture 163. For example, the liquid fuel 159 (e.g., Jet A) may generally define a larger detonation cell size than the gaseous fuel (e.g., hydrogen, ethylene). Adjusting the ratio of the gaseous fuel 161 mixed with the liquid fuel 159 may adjust the detonation cell size of the gas-liquid fuel mixture 163. Adjusting the ratio of the gaseous fuel 161 mixed with the liquid fuel 159 relative to the pressure and temperature of oxidizer 195 entering the RDC system 100 (and changes thereof relative to the plurality of second operating condition of the propulsion system 102) may maintain an approximately constant detonation cell size at the combustion chamber 122 from the first operating condition to the plurality of second operating conditions.

The methods 700 and 800 may further include at 780 and 880, respectively, adjusting the flow of liquid fuel based at least on the commanded operating condition of the propulsion system. The commanded operating condition of the propulsion system (e.g., propulsion system 102) may generally include any user input or computer input desired operating condition. In various embodiments, such as a propulsion system providing thrust or other locomotive force for an aircraft, the commanded operating condition may be based on a power level angle or thrust lever position. One or more computing devices including one or more processors and one or more memory devices configured to store instructions and execute operations may translate the commanded operating condition into one or more parameters based at least on one or more of a commanded thrust output, shaft speed, and engine pressure ratio (EPR). For example, the commanded thrust output, the shaft speed (e.g., fan shaft speed $N_{FAN}$, propeller speed, low spool speed $N_1$ or $N_L$, intermediate spool speed $N_I$, high spool speed $N_2$ or $N_H$, etc.), and the EPR may be based at on one or more parameters such as a fuel flow rate and/or pressure, and oxidizer flow rate, pressure, and/or temperature, one or more variable guide vane or variable stator vane angles, one or more bleed valve positions (e.g., percentage open or close), or combinations thereof that may output an actual thrust output, shaft speed, or EPR based on the commanded operating condition.

The methods 700 and 800 generally provided herein may further define the ratio of gas and liquid fuel mixture of the fuel flow that may produce the actual thrust output, shaft speed, or EPR based on the commanded operating condition. For example, the methods 700 and 800 may generally determine a volumetric flow rate of gas to mix with the liquid fuel based at least on the liquid fuel flow rate and a desired two-phase flow regime of a gas-liquid fuel mixture such as generally provided in FIG. 7. The mixture of gas and liquid fuel may provide an effervescent atomization of the fuel mixture 163 that may yield combustion products 138 with desired or optimal levels of emissions, specific fuel consumption, and operability, such as a desired detonation cell size across a plurality of operating conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method of effervescent atomization of a liquid fuel for a rotating detonation combustor (RDC) system for a propulsion system, the method comprising:
   flowing an oxidizer through the RDC system;
   flowing the liquid fuel through a fuel injection port of a nozzle assembly of the RDC system;
   flowing a first portion of the oxidizer through the fuel injection port of the nozzle assembly volumetrically proportional to the liquid fuel;

producing a first mixture at the fuel injection port by mixing the flow of the first portion of the oxidizer and the flow of the liquid fuel;

flowing a second portion of the oxidizer through a nozzle flowpath of the RDC system;

producing a second mixture by mixing the first mixture and the flow of the second portion of the oxidizer within the nozzle flowpath;

igniting the second mixture within a combustion chamber of the RDC system; and adjusting a volumetric flow of the first portion of the oxidizer relative to the liquid fuel based at least on a commanded operating condition of the propulsion system.

2. The method of claim 1, wherein producing the first mixture includes producing a volumetric flow ratio of the first portion of the oxidizer to the liquid fuel of 1000% or less.

3. The method of claim 1, wherein flowing the first portion of the oxidizer includes flowing the first potion of the oxidizer at a pressure greater than a pressure of the flow of the liquid fuel within the fuel injection port.

4. The method of claim 1, wherein producing the first mixture includes producing a mass flow ratio of the first portion of the oxidizer to the liquid fuel of 30% or less.

5. The method of claim 1, wherein producing the first mixture defines an annular flow, a mist flow, or a disperse flow of the first mixture based at least on a volumetric flux of the first portion of the oxidizer and a volumetric flux of the liquid fuel.

6. A method of operating a propulsion system at a constant detonation cell size for a propulsion system comprising a rotating detonation combustion (RDC) system with effervescent atomization of a liquid fuel, the method comprising:

flowing the liquid fuel through a fuel injection port of a nozzle assembly of the RDC system;

flowing a gaseous fuel through the fuel injection port of the nozzle assembly volumetrically proportional to the liquid fuel;

producing a gaseous fuel-liquid fuel mixture at the fuel injection port by mixing the flow of the gaseous fuel and the flow of the liquid fuel;

flowing an oxidizer through a nozzle flowpath of the RDC system;

producing an oxidizer-gaseous fuel-liquid fuel mixture by mixing the gaseous fuel-liquid fuel mixture and the flow of the oxidizer within the nozzle flowpath;

igniting the oxidizer-gaseous fuel-liquid fuel mixture within a combustion chamber of the RDC system; and adjusting a volumetric flow of the gaseous fuel relative to the liquid fuel based at least on a commanded operating condition of the propulsion system.

7. The method of claim 6, wherein flowing the gaseous fuel is based at least on a desired detonation cell size at a first operating condition of the propulsion system.

8. The method of claim 7, wherein adjusting the volumetric flow of the gaseous fuel is based at least on maintaining a constant detonation cell width at a second operating condition greater than the first operating condition.

9. The method of claim 8, wherein adjusting the volumetric flow of the gaseous fuel is based at least on maintaining a constant detonation cell width at a stoichiometric ratio of 1.0 or less at the second operating condition.

10. The method of claim 6, wherein adjusting the volumetric flow of the gaseous fuel is based at least on a pressure and a temperature of the oxidizer at the RDC system.

11. The method of claim 6, wherein flowing the gaseous fuel includes defining a detonation cell width of the gaseous fuel less than a detonation cell width of the liquid fuel.

12. The method of claim 6, further comprising: adjusting the flow of the liquid fuel based at least on the commanded operating condition of the propulsion system.

13. The method of claim 6, wherein producing the gaseous fuel-liquid fuel mixture includes producing a volumetric flow ratio of the gaseous fuel to the liquid fuel of 1000% or less.

14. The method of claim 6, wherein producing the gaseous fuel-liquid fuel mixture includes producing a mass flow ratio of the gaseous fuel to the liquid fuel of 30% or less.

15. The method of claim 6, wherein producing the gaseous fuel-liquid fuel mixture defines an annular flow, a mist flow, or a disperse flow of the gaseous fuel-liquid fuel mixture based at least on a gaseous fuel volumetric flux and a liquid fuel volumetric flux.

16. A method of effervescent atomization of a liquid fuel for a rotating detonation combustor (RDC) system for a propulsion system, the method comprising:

flowing the liquid fuel through a fuel injection port of a nozzle assembly of the RDC system;

flowing a gas through the fuel injection port of the nozzle assembly volumetrically proportional to the liquid fuel, wherein the gas is an inert gas;

producing a gas-liquid fuel mixture at the fuel injection port by mixing the flow of the gas and the flow of the liquid fuel;

flowing an oxidizer through a nozzle flowpath of the RDC system;

producing an oxidizer-gas-liquid fuel mixture by mixing the gas-liquid fuel mixture and the flow of the oxidizer within the nozzle flowpath;

igniting the oxidizer-gas-liquid fuel mixture within a combustion chamber of the RDC system; and adjusting a volumetric flow of the gas relative to the liquid fuel based at least on a commanded operating condition of the propulsion system.

* * * * *